US007890450B2

(12) United States Patent
Kikuchi et al.

(10) Patent No.: US 7,890,450 B2
(45) Date of Patent: Feb. 15, 2011

(54) POLICY CREATING APPARATUS, POLICY CREATING METHOD, AND COMPUTER PRODUCT

(75) Inventors: Shinji Kikuchi, Kawasaki (JP); Satoshi Tsuchiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 17 days.

(21) Appl. No.: 12/539,291

(22) Filed: Aug. 11, 2009

(65) Prior Publication Data

US 2009/0299936 A1 Dec. 3, 2009

Related U.S. Application Data

(63) Continuation of application No. PCT/JP2007/055409, filed on Mar. 16, 2007.

(51) Int. Cl.
*G06N 5/02* (2006.01)

(52) U.S. Cl. ........................... 706/62; 706/46; 709/223

(58) Field of Classification Search .................. 706/46, 706/62; 709/223; 370/516
See application file for complete search history.

(56) References Cited

U.S. PATENT DOCUMENTS

| | | | | |
|---|---|---|---|---|
| 5,341,477 | A | 8/1994 | Pitkin et al. | |
| 2005/0154576 | A1 | 7/2005 | Tarui et al. | |
| 2008/0235173 | A1* | 9/2008 | Doyle et al. | 706/46 |

FOREIGN PATENT DOCUMENTS

| | | |
|---|---|---|
| JP | A 3-116262 | 5/1991 |
| JP | A 2002-500785 | 1/2002 |
| JP | A 2002-247033 | 8/2002 |
| JP | A 2003-18156 | 1/2003 |
| JP | A 2003-298637 | 10/2003 |
| JP | A 2004-40433 | 2/2004 |
| JP | A 2005-196601 | 7/2005 |
| WO | WO 98/26553 A1 | 6/1998 |

OTHER PUBLICATIONS

DP Tsay, MT Liu, "MIKE: A network operating system for the distributed double-loop computer network", IEEE Transactions on Software Engineering, vol. 2, 1983, pp. 143-154.*

(Continued)

*Primary Examiner*—Donald Sparks
*Assistant Examiner*—Ola Olude-Afolabi
(74) *Attorney, Agent, or Firm*—Greer, Burns & Crain, Ltd.

(57) ABSTRACT

A policy integrity validating unit validates whether a system model can achieve an objective set up in a policy without violating a constraint set up in the policy when a system model is operated according to a procedure set up in the policy. When the policy integrity validating unit determines that there is no integrity between a policy created by a system administrator and the system model, an alternate policy creating unit creates an alternate policy that replaces the policy created by the system administrator. Upon receipt of the alternate policy, the policy integrity validating unit validates integrity between the alternate policy and the system model. When the policy integrity validating unit determines that there is integrity between the alternate policy and the system model, a policy creating apparatus presents the alternate policy to the system administrator.

18 Claims, 12 Drawing Sheets

POLICY CREATING APPARATUS
SYSTEM ADMINISTRATOR
POLICY
PROCEDURE: IF RT > 0.5, INSTALL MORE SERVER
CONSTRAINT: NUMBER OF SERVERS IS AT MOST THREE
OBJECTIVE: RT < 1.0
(1)
(2)
SYSTEM MODEL
POLICY
POLICY INTEGRITY VALIDATING UNIT
ALTERNATE POLICY CREATING UNIT
ALTERNATE POLICY
(1) IF RT > 0.8, INSTALL MORE SERVERS
(2) USE FOUR SERVERS
(3) PERMITTED IF RT < 1.2
(4)
(3)
ALTERNATE POLICY
(5)
SELECT AND APPROVE
DISTRIBUTE POLICY
SYSTEM MODEL
MANAGED SYSTEM
APPLICATION EXAMPLE STORAGE UNIT
POLICY MODIFYING STRATEGY STORAGE UNIT
(6)
APPLIED POLICY INFORMATION

OTHER PUBLICATIONS

Simmons B et al: "A Policy-Based Framework for Managing Data Centers;" Network Operations and Management Symposium, 2006. NOMS 2006. 10th IEE E/IFIP Vancouver, BC, Canada Apr. 3-7, 2006, Piscataway, NJ, USA, IEEE, Apr. 3, 2006, pp. 1-4.

Anthony: "A Policy-Definition Language and Prototype Implementation Library for Policy-based Autonomic Systems;" Autonomic Computing, 2006. ICAC '06. IEEE International Conference on Dublin, Ireland Jun. 13-16, 2006, Piscataway, NJ, USA, IEEE, Jan. 1, 2006, pp. 265-276.

Leonidas Lymberopoulos et al: "An Adaptive Policy-Based Framework for Network Services Management;" Journal of Network and Systems Management, Kluwer Academic Publishers-Plenum Publishers, NE, vol. 11, No. 3, Sep. 1, 2003, pp. 277-303.

Sheridan-Smith N et al: "A Policy-Driven Autonomous System for Evolutive and Adaptive Management of Complex Services and Networks;" Engineering of Computer-Based Systems, 2005. ECBS '05. 12$^{th}$ IEEE International Conference and Workshops on the Greenbelt, MD, USA Apr. 4-7, 2005, Piscataway, NJ, USA, IEEE, Apr. 4, 2005, pp. 389-397.

Nancy Samaan et al: "A Novel Approach Towards Autonomic Management in ContextAware Communication Systems;" Jan. 1, 2005, Mobility Aware Technologies and Applications Lecture Notes in Computer Science; LNCS, Springer, Berlin, DE, pp. 374-383.

* cited by examiner

FIG.4

| | |
|---|---|
| (1) | TRANSACTION FREQUENCY THAT SYSTEM SHOULD PERMIT x(transaction/sec) $0 \leq x \leq 300$ |
| (2) | NUMBER OF PRIMARY SERVERS IN i-TH LAYER $PS_i$ $PS_1=2$, $PS_2=1$ |
| (3) | INITIAL VALUE OF NUMBER $SS_i$ OF SPARE SERVER THAT ARE USED IN i-TH LAYER $PS_1=SS_2=0$ |
| (4) | ALL PERFORMANCES OF SERVERS ARE SAME |
| (5) | LOAD BALANCER EVENLY DISTRIBUTES TRANSACTION AMONG SERVERS THAT ARE UTILIZED |
| (6) | TRANSACTION AVERAGE PROCESSING TIME T1 IN FIRST LAYER IS M/M/1 WAITING QUEUE $T_1=\frac{\alpha}{1-\alpha\cdot\frac{x}{N_1}}$ ($N_i$ REPRESENTS NUMBER OF SERVERS IN i-TH LAYER ($N_i=PS_i+SS_i$), $\alpha$ REPRESENTS PROCESSING RATE IN WAITING QUEUE) |
| (7) | TRANSACTION AVERAGE PROCESSING TIME IN SECOND LAYER IS PROPORTIONAL TO TRANSACTION FREQUENCY $T_2=\beta\cdot\frac{x}{N_2}+\gamma$ ($\beta$ IS PROPORTIONAL PART OF PROCESSING TIME NECESSARY FOR 1 TRANSACTION, $\gamma$ REPRESENTS FIXED PART) |
| (8) | PARAMETERS $\alpha$, $\beta$, AND $\gamma$ THAT REPRESENT SERVER PERFORMANCE ARE AS FOLLOWS: $\alpha=0.01$, $\beta=0.002$, $\gamma=0.02$ |

FIG.5

| | |
|---|---|
| (1) PROCEDURE | PROCEDURE RULE 1:<br>IF TRANSACTION AVERAGE RESPONSE TIME IS 0.6 SECONDS OR MORE ($T_1+T_2 \geq 0.6$), 1 SERVER IS ADDED TO LAYER AS PERFORMANCE BOTTLE NECK FROM SERVER POOL<br>(if (($T_1+T_2 \geq 0.6$) & ($T_1 \geq T_2$)) then $SS_1$++;<br>if (($T_1+T_2 \geq 0.6$) & ($T_1 \leq T_2$)) then $SS_2$++;)<br>PROCEDURE RULE 2:<br>IF SERVER IS BORROWED FROM SERVER POOL, ONE SERVER IS DELETED RANDOMLY IN SPARE SERVER THAT ARE USED WHEN TRANSACTION AVERAGE RESPONSE TIME IS 0.25 SECONDS OR LESS ($T_1+T_2 \leq 0.25$)<br>(if (($T_1+T_2 \leq 0.25$) & ($SS_1 > 0$)) then $SS_1$—;<br>if (($T_1+T_2 \leq 0.25$) & ($SS_2 > 0$)) then $SS_2$—;) |
| (2) CONSTRAINT | NUMBER OF SERVERS BORROWED FROM SERVER POOL IS ALWAYS THREE OR LESS<br>($SS_1+SS_2 \leq 3$) |
| (3) OBJECTIVE | BY APPLYING PROCEDURE RULE, RESPONSE TIME BECOMES 1 SECOND OR LESS IN END<br>($T_1+T_2 \leq 1.0$) |

FIG.6

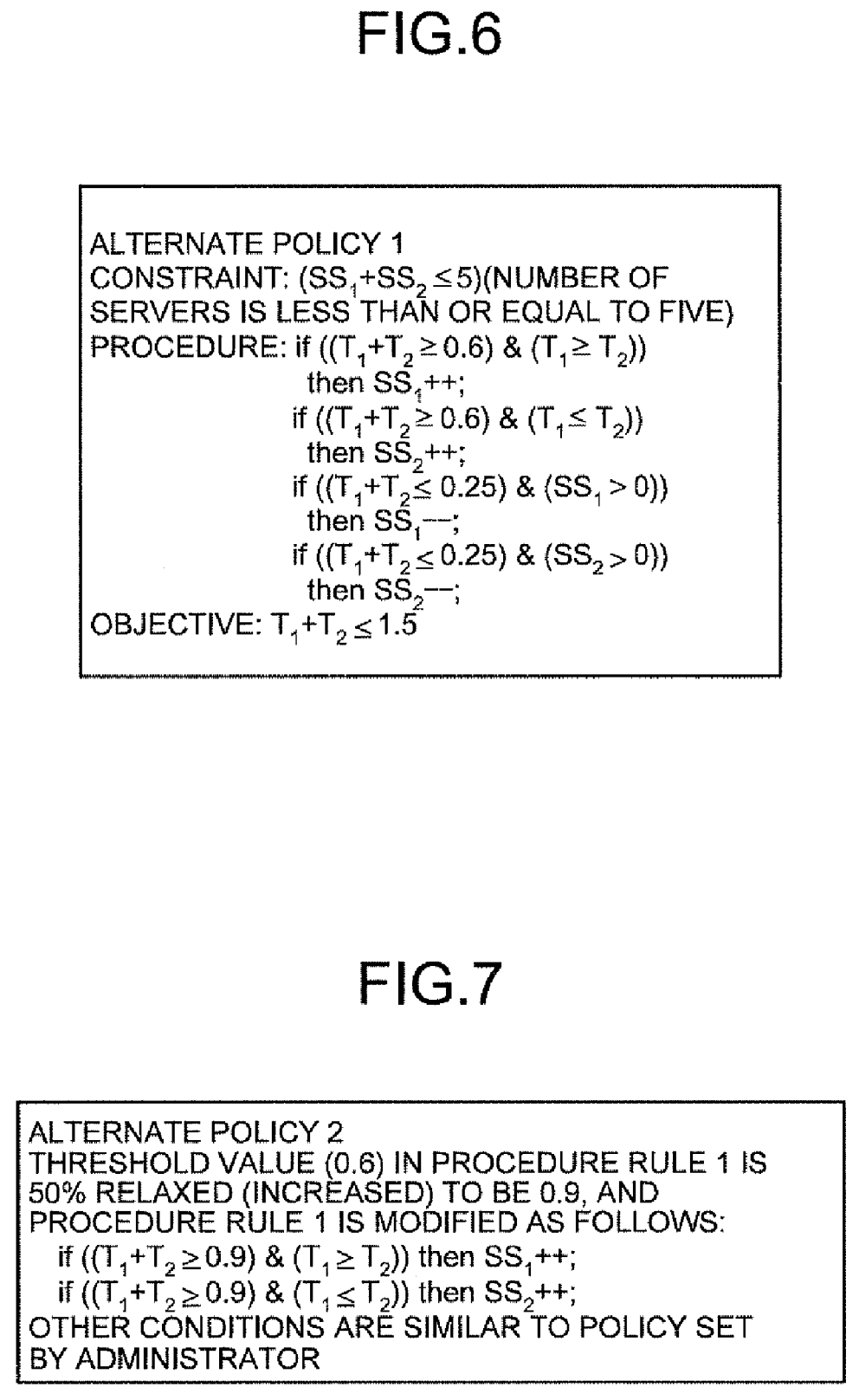

ALTERNATE POLICY 1
CONSTRAINT: ($SS_1+SS_2 \leq 5$)(NUMBER OF SERVERS IS LESS THAN OR EQUAL TO FIVE)
PROCEDURE: if (($T_1+T_2 \geq 0.6$) & ($T_1 \geq T_2$))
then $SS_1$++;
if (($T_1+T_2 \geq 0.6$) & ($T_1 \leq T_2$))
then $SS_2$++;
if (($T_1+T_2 \leq 0.25$) & ($SS_1 > 0$))
then $SS_1$--;
if (($T_1+T_2 \leq 0.25$) & ($SS_2 > 0$))
then $SS_2$--;
OBJECTIVE: $T_1+T_2 \leq 1.5$

FIG.7

ALTERNATE POLICY 2
THRESHOLD VALUE (0.6) IN PROCEDURE RULE 1 IS 50% RELAXED (INCREASED) TO BE 0.9, AND PROCEDURE RULE 1 IS MODIFIED AS FOLLOWS:
if (($T_1+T_2 \geq 0.9$) & ($T_1 \geq T_2$)) then $SS_1$++;
if (($T_1+T_2 \geq 0.9$) & ($T_1 \leq T_2$)) then $SS_2$++;
OTHER CONDITIONS ARE SIMILAR TO POLICY SET BY ADMINISTRATOR

FIG.8

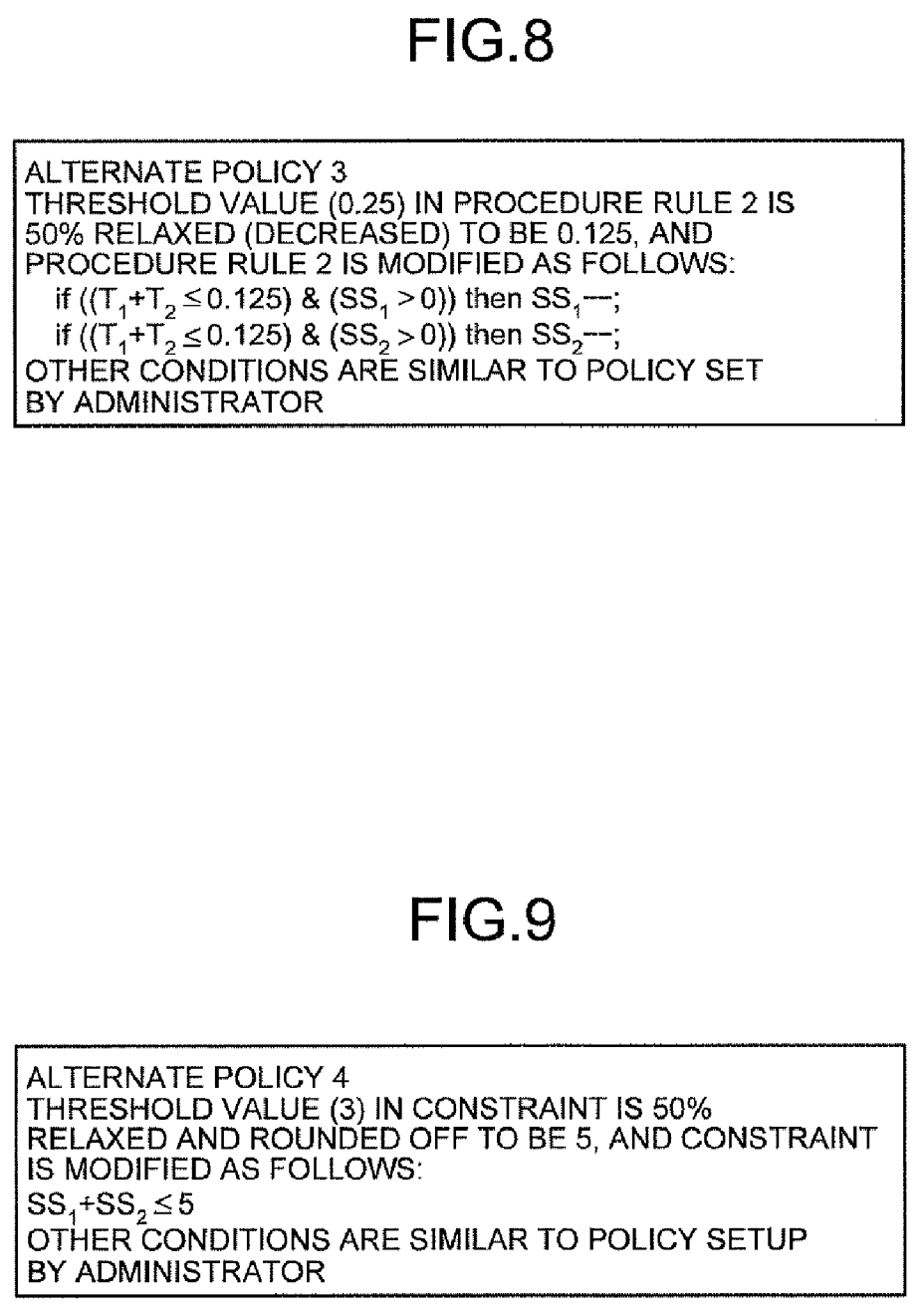

ALTERNATE POLICY 3
THRESHOLD VALUE (0.25) IN PROCEDURE RULE 2 IS 50% RELAXED (DECREASED) TO BE 0.125, AND PROCEDURE RULE 2 IS MODIFIED AS FOLLOWS:

if $((T_1+T_2 \leq 0.125)$ & $(SS_1 > 0))$ then $SS_1$--;

if $((T_1+T_2 \leq 0.125)$ & $(SS_2 > 0))$ then $SS_2$--;

OTHER CONDITIONS ARE SIMILAR TO POLICY SET BY ADMINISTRATOR

FIG.9

ALTERNATE POLICY 4
THRESHOLD VALUE (3) IN CONSTRAINT IS 50% RELAXED AND ROUNDED OFF TO BE 5, AND CONSTRAINT IS MODIFIED AS FOLLOWS:

$SS_1+SS_2 \leq 5$

OTHER CONDITIONS ARE SIMILAR TO POLICY SETUP BY ADMINISTRATOR

FIG.10

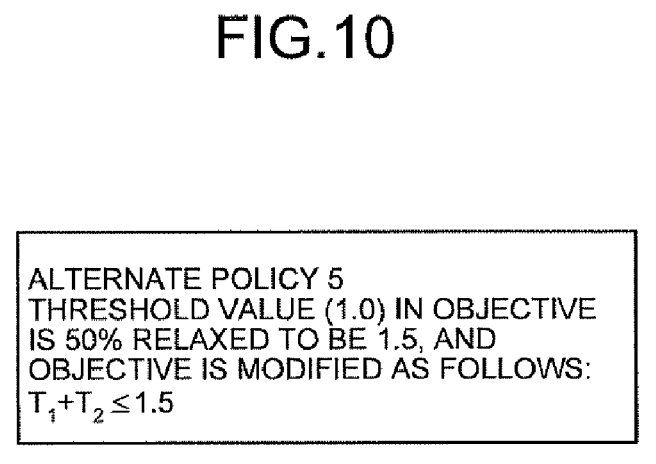

ALTERNATE POLICY 5
THRESHOLD VALUE (1.0) IN OBJECTIVE IS 50% RELAXED TO BE 1.5, AND OBJECTIVE IS MODIFIED AS FOLLOWS:
$T_1+T_2 \leq 1.5$

FIG.11

| RECOMMENDED PRIORITY | CONSTRAINT | PROCEDURE | OBJECTIVE | REMARKS |
|---|---|---|---|---|
| 1 | $SS_1+SS_2 \le 5$ | if $((T_1+T_2 \ge 0.6)$ & $(T_1 \ge T_2))$ then $SS_1{++}$;<br>if $((T_1+T_2 \ge 0.6)$ & $(T_1 \le T_2))$ then $SS_2{++}$;<br>if $((T_1+T_2 \le 0.25)$ & $(SS_1 > 0))$ then $SS_1{--}$;<br>if $((T_1+T_2 \le 0.25)$ & $(SS_2 > 0))$ then $SS_2{--}$; | $T_1+T_2 \le 1.5$ | APPLIED ON 2006/10/21 |
| 2 | $SS_1+SS_2 \le 3$ | if $((T_1+T_2 \ge 0.9)$ & $(T_1 \ge T_2))$ then $SS_1{++}$;<br>if $((T_1+T_2 \ge 0.9)$ & $(T_1 \le T_2))$ then $SS_2{++}$;<br>if $((T_1+T_2 \le 0.25)$ & $(SS_1 > 0))$ then $SS_1{--}$;<br>if $((T_1+T_2 \le 0.25)$ & $(SS_2 > 0))$ then $SS_2{--}$; | $T_1+T_2 \le 1.0$ | PROCEDURE IS MODIFIED |
| 3 | $SS_1+SS_2 \le 3$ | if $((T_1+T_2 \ge 0.6)$ & $(T_1 \ge T_2))$ then $SS_1{++}$;<br>if $((T_1+T_2 \ge 0.6)$ & $(T_1 \le T_2))$ then $SS_2{++}$;<br>if $((T_1+T_2 \le 0.125)$ & $(SS_1 > 0))$ then $SS_1{--}$;<br>if $((T_1+T_2 \le 0.125)$ & $(SS_2 > 0))$ then $SS_2{--}$; | $T_1+T_2 \le 2.0$ | PROCEDURE AND OBJECTIVE ARE MODIFIED |
| 4 | $SS_1+SS_2 \le 8$ | if $((T_1+T_2 \ge 0.6)$ & $(T_1 \ge T_2))$ then $SS_1{++}$;<br>if $((T_1+T_2 \ge 0.6)$ & $(T_1 \le T_2))$ then $SS_2{++}$; | $T_1+T_2 \le 1.0$ | CONSTRAINT IS MODIFIED AND PROCEDURE IS DELETED |

POLICY CREATING APPARATUS, POLICY CREATING METHOD, AND COMPUTER PRODUCT

CROSS-REFERENCE TO RELATED APPLICATION

This application is a continuation of PCT international application Ser. No. PCT/JP2007/055409 filed on Mar. 16, 2007 which designates the United States, the entire contents of which are incorporated herein by reference.

FIELD

The embodiment discussed herein is directed to a policy creating apparatus, a policy creating method, and a computer product.

BACKGROUND

In recent years, studies on an autonomous system are under progress to control an increasingly complex information system and to achieve stable operation thereof. A policy-based autonomous system has received attention as a core technology thereof. To explain briefly, in the policy-based system, a constraint that the system needs to satisfy or an executive operation (procedure) is described as a policy according to a service level objective (SLO) and the like, and then, the policy is provided to the system. The system to which the policy is provided autonomously interprets the policy and autonomously controls resources and the like depending on situations.

In such an autonomous system, whether the policy operates properly in the system, that is, integrity between the policy and the system is required to be validated. For example, Japanese Laid-open Patent Publication No. 2005-196601 discloses a technology in which a test scenario prepared by a system administrator is applied to an autonomous system and whether the policy properly operates in the autonomous system is validated by utilizing a simulation result of the autonomous system operated according to the test scenario.

If no integrity is detected between the policy and the system, a system administrator devises a method for modifying the policy to prevent a system failure by modifying the policy.

In the conventional technology described above, however, integrity between the policy and the system may not always be validated and to modify such a policy requires substantial time and effort.

In other words, in the conventional technology, if the autonomous system does not operate according to the test scenario in the first place, integrity between the policy and the system cannot be validated although integrity of the policy can be validated if the autonomous system operates according to a test scenario and a simulation result can be thus obtained.

Further, in validation utilizing the simulation result, no integrity between the policy and the system that is very unlikely to manifest may be missed out.

Furthermore, substantial time and effort are required because the system administrator is obliged to modify the policy through trail and error each time no integrity is detected between the policy and the system.

SUMMARY

According to an aspect of an embodiment, a policy creating apparatus creates a policy applied to a managed system to control autonomous operation of the managed system. The policy creating apparatus includes a policy receiving unit, a model receiving unit, a policy validating unit, an alternate policy creating unit, a policy revalidating unit, and an alternate policy presenting unit. The policy receiving unit receives an administrator created policy created by a system administrator. The model receiving unit receives a system model obtained by modeling characteristics of the managed system. The policy validating unit validates integrity between the administrator created policy received by the policy receiving unit and the system model received by the model receiving unit. The alternate policy creating unit creates an alternate policy that replaces the administrator created policy when the policy validating unit determines that there is no integrity between the administrator created policy and the system model. The policy revalidating unit revalidates integrity between the alternate policy created by the alternate policy creating unit and the system model. The alternate policy presenting unit presents the alternate policy to the system administrator when the policy revalidating unit determines that there is integrity between the alternate policy and the system model.

According to another aspect of an embodiment, there is provided a policy creating method for creating a policy applied to a managed system to control autonomous operation of the managed system. The policy creating method includes: receiving an administrator created policy created by a system administrator; receiving a system model obtained by modeling characteristics of the managed system; validating integrity between the administrator created policy and the system model; creating an alternate policy that replaces the administrator created policy when it is determined that there is no integrity between the administrator created policy and the system model at the validating; revalidating integrity between the alternate policy created at the creating and the system model; and presenting the alternate policy to the system administrator when it is determined that there is integrity between the alternate policy and the system model at the revalidating.

According to still another aspect of an embodiment, a computer readable storage medium stores instructions that, when executed by a computer, causes the computer to perform the above method.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an example of a configuration of a system model;

FIG. 5 is an example of a set-up policy created by a system administrator;

FIGS. 6 to 10 are examples of an alternate policy;

FIG. 11 is an example of a presented alternate policy;

DESCRIPTION OF EMBODIMENTS

Exemplary embodiments of the invention are described in detail below with reference to the accompanying drawings.

[a] First Embodiment

In the following, an overview and feature of a policy creating apparatus according to a first embodiment of the present invention, the configuration and operation thereof are described.

Figure 1:
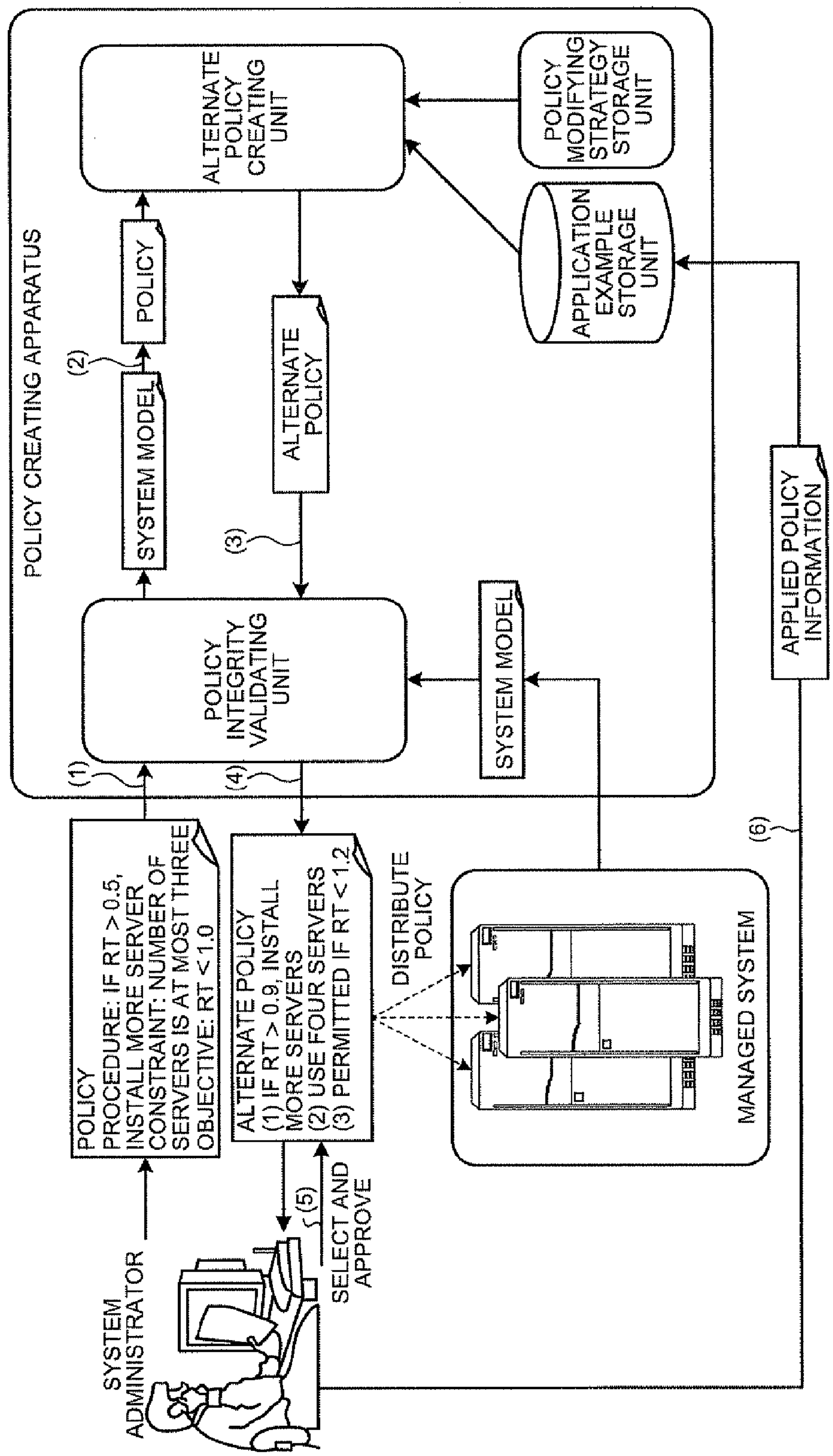
FIG. 1 is a diagram for explaining an overview and a feature of a policy creating apparatus according to a first embodiment of the present invention.

An overview and feature of the policy creating apparatus according to the first embodiment are described in detail below with reference to FIG. 1. FIG. 1 is a diagram for explaining an overview and a feature of the policy creating apparatus according to the first embodiment.

Generally, the policy creating apparatus according to the first embodiment creates a policy applied to a system to control autonomous operation in the managed system. A main feature of the policy creating apparatus is, however, that integrity between the system and the policy can be validated without using a test scenario and that a modified policy can be obtained without the need for substantial time and effort.

To describe the main feature in detail, as depicted in FIG. 1, the policy creating apparatus according to the first embodiment receives, from a terminal operated by the system administrator, a policy created by the system administrator and a system model obtained by modeling characteristics of the managed system (see (1) in FIG. 1).

A procedure to control operation performed by the managed system, a constraint to be observed by the managed system in operation, and an objective to be achieved by the managed system are set up in the policy created by the system administrator. The system model is created in such a manner that characteristics of the managed system is measured by using a benchmark, and, for example, the system administrator measures models the managed system by defining the managed system by using the information obtained by the measurement.

Upon receiving the policy created by the system administrator and the system model of the managed system, a policy integrity validating unit of the policy creating apparatus validates integrity between the policy created by the system administrator and the system model. More specifically, the policy integrity validating unit validates if the system model can reach the objective set up in the policy without violating the constraint set up in the policy when the system model is operated according to the procedure set up in the policy.

The policy integrity validating unit determines that there is integrity between the policy created by the system administrator and the system model when the system model can reach the objective set up in the policy without violating the constraint set up in the policy by operating the system model according to the procedure set up in the policy in any state that the system model can reach from the initial state. When the policy integrity validating unit determines that there is integrity between the policy created by the system administrator and the managed system, the policy integrity validating unit notifies the system administrator of the integrity.

On the other hand, the policy integrity validating unit determines that there is no integrity between the policy created by the system administrator and the system model in a situation such as when the system model violates the constraint set up in the policy or can not reach the objective set up in the policy when the system model is operated according to the procedure set up in the policy, and when the system model results in a livelock in which operation performed by the system is never terminated and ends up in an infinite loop when the system model is operated according to the procedure set up in the policy. Then, an alternate policy creating unit creates an alternate policy that replaces the policy created by the system administrator (see (2) in FIG. 1).

More specifically, the policy creating apparatus includes, in advance, an application example storage unit that stores therein previous application examples in which it is determined that there is integrity between the system and the policy, and a policy modifying strategy storage unit that stores therein policy modifying strategies that are used to create an alternate policy. The alternate policy creating unit refers to the application examples stored in the application example storage unit and if there is a policy that corresponds to the managed system modeled as the system model, the alternate policy creating unit adapts the policy that corresponds thereto as an alternate policy.

The alternate policy creating unit creates an alternate policy by modifying any one of or a plurality of the procedure, the constraint, and the objective set up in the policy created by the system administrator according to the policy modifying strategies stored in the policy modifying strategy storage unit. The policy modifying strategies includes: a threshold value relaxing method in which any one of or a plurality of the threshold values adapted in the procedure, the constraint, and the objective set up in the policy created by the system administrator are relaxed to create an alternate policy; a constraint deleting method in which one or a plurality of the set-up items in the constraint is deleted to create an alternate policy; and a procedure limiting method in which the set-up item in the procedure is limited to create an alternate policy.

After creating an alternate policy, the alternate policy creating unit delivers the created alternate policy to a policy integrity validating unit (see (3) in FIG. 1). The policy integrity validating unit receives the alternate policy, and then, validates integrity between the alternate policy and the system model. If the policy integrity validating unit determines that there is integrity between the alternate policy and the system model, the policy creating apparatus presents the alternate policy to the system administrator (see (4) in FIG. 1).

The policy creating apparatus may present the alternate policies in a ranked manner to the system administrator. For example, the alternate policies are ranked so that alternate policies with less modifications made to the procedure, the constraint, and the objective set up in the policy are ranked higher in recommended priority. If there are alternate policies in which the same number of modifications are made, the alternate policies are ranked so that an alternate policy in which the constraint is modified is ranked higher in recommended priority than an alternate policy in which the objective is modified and an alternate policy in which the procedure is modified is ranked higher in recommended priority than an alternate policy in which the constraint is modified.

If the system administrator receives a plurality of alternate polices presented by the policy creating apparatus via a terminal operated by the system administrator, the system administrator selects one of the alternate policies and approves the alternate policy (see (5) in FIG. 1). The system administrator may distribute and apply the approved alternate policy to the managed system, or may self-create a new policy by referring to the alternate policy.

The policy creating apparatus stores, in the application example storage unit, information about corresponding relationship between each alternate policy in which the policy integrity validating unit has determined that there is integrity and that are distributed and applied to the managed system by the system administrator and the managed system. The information is stored to be later utilized for creating an alternate policy for a similar system.

Thus, as described in the main feature of the policy creating apparatus according to the first embodiment, the policy creating apparatus can validate integrity between the system and the policies without using a test scenario, and also can obtain a modified policy (that is, an alternate policy) without the need for substantial time and effort.

Figure 2:
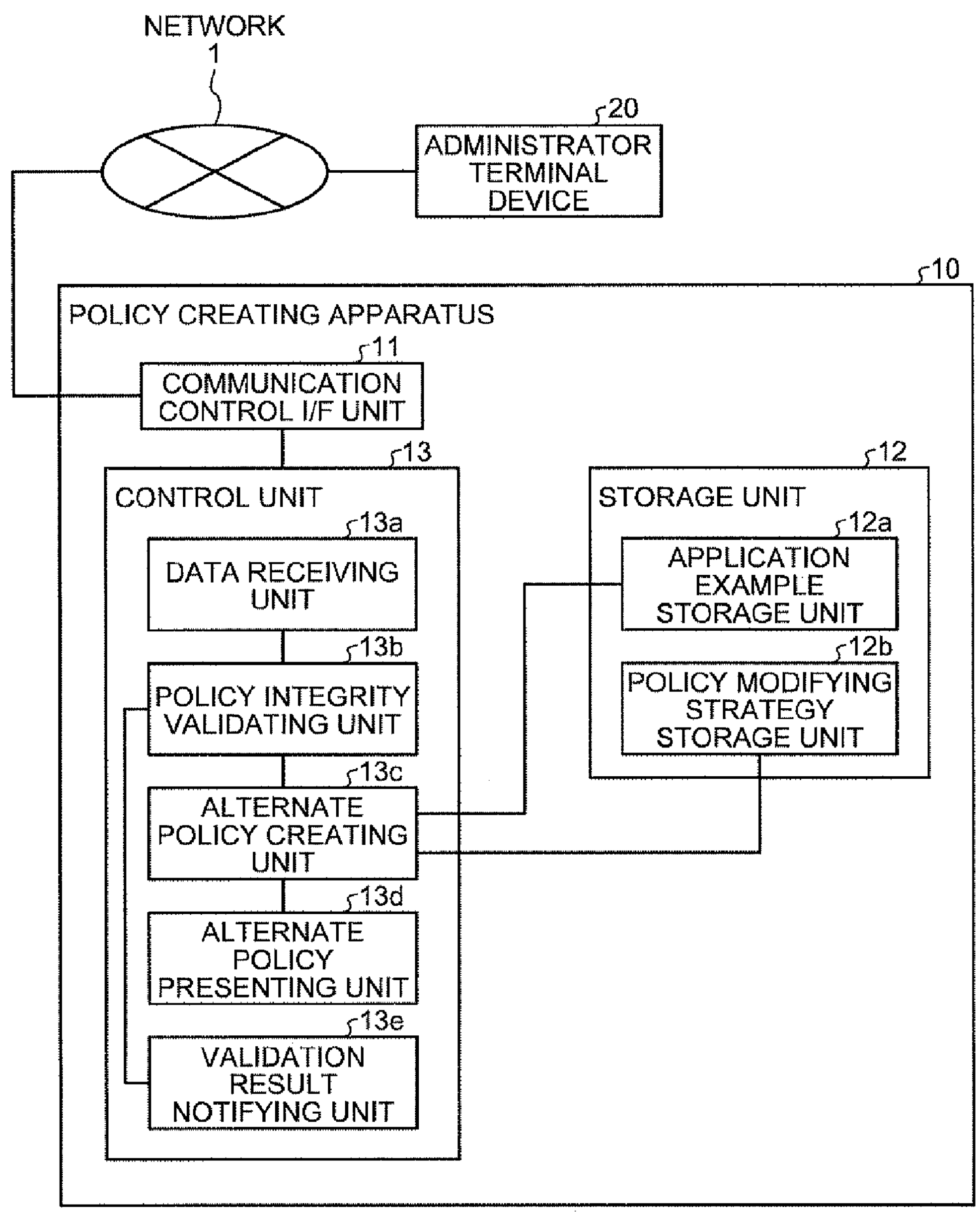
FIG. 2 is a configuration of the policy creating apparatus according to the first embodiment.
Figure 3:
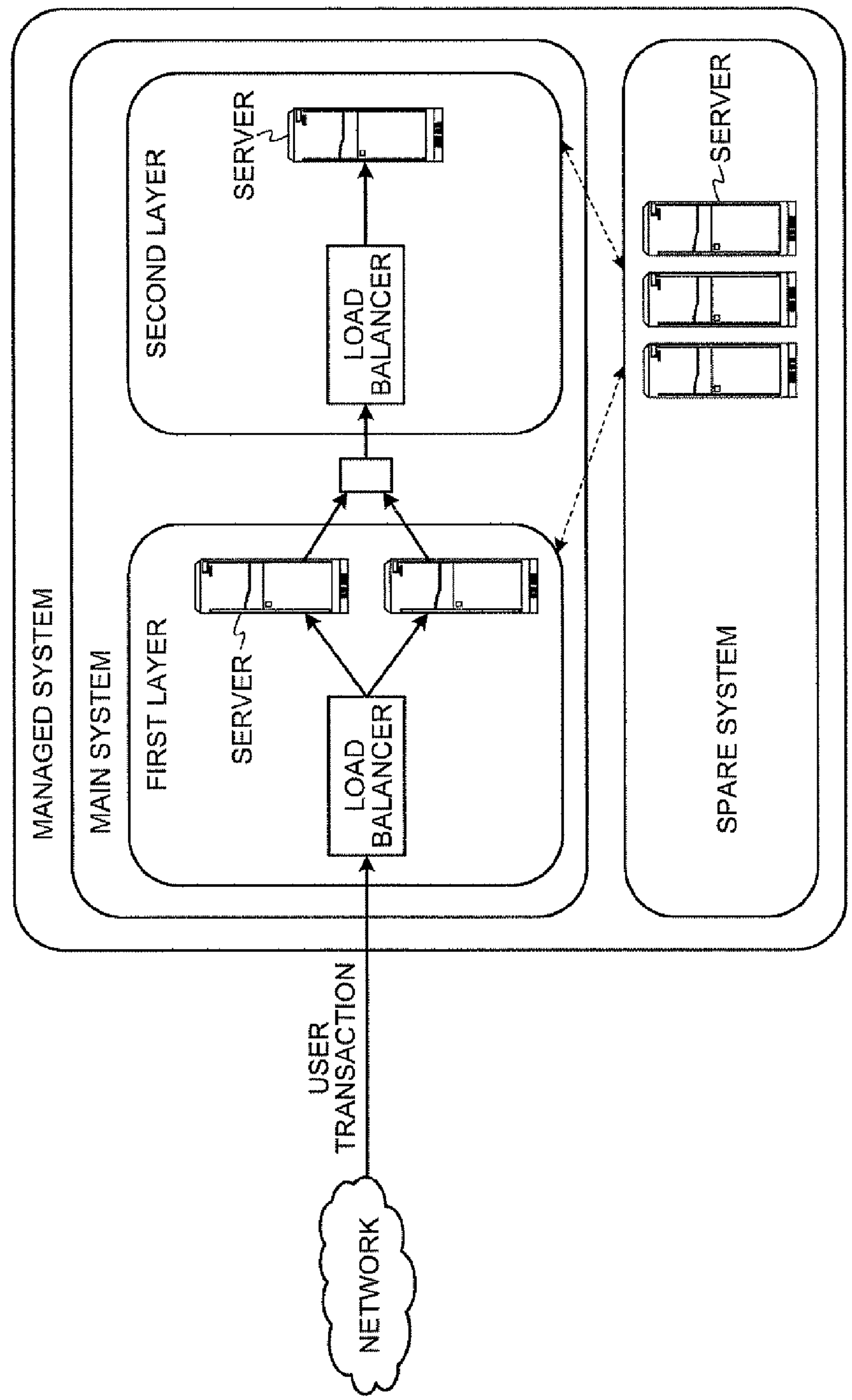
FIG. 3 is an example of a configuration of a managed system.

A configuration of the policy creating apparatus according to the first embodiment is described in detail below with reference to FIGS. 2 to 11. FIG. 2 is a block diagram of a configuration of the policy creating apparatus according to the first embodiment. FIG. 3 is a diagram of a configuration example of a managed system. FIG. 4 is a diagram of a configuration example of a system model. FIG. 5 is a diagram of a set-up example of a policy created by the system administrator. FIG. 6 is a diagram of an example of an alternate policy. FIG. 7 is a diagram of another example of an alternate policy. FIG. 8 is a diagram of still another example of an alternate policy. FIG. 9 is a diagram of still another example of an alternate policy. FIG. 10 is a diagram of still another example of an alternate policy. FIG. 11 is a diagram of an example of presenting an alternate policy.

As depicted in FIG. 2, a policy creating apparatus 10 according to the first embodiment includes a communication control I/F unit 11, a storage unit 12, and a control unit 13. Among the units, the communication control I/F unit 11 controls communication of various pieces of information transmitted between an administrator terminal device 20 and the policy creating apparatus 10.

The storage unit 12, which stores therein data and a program that are necessary for various processes performed by the control unit 13, includes an application example storage unit 12*a* and a policy modifying strategy storage unit 12*b*.

Among the two storage units, the application example storage unit 12*a* stores therein previous application examples in which it is determined that there is integrity between the system and the policy. For example, the application example storage unit 12*a* is configured so that relationships between the system models and the policies in which it is determined that there is integrity therebetween are stored therein. The application example storage unit 12*a* stores therein information about corresponding relationships between the alternate policies in which a policy integrity validating unit 13*b* that is described later in detail determines that there is integrity therebetween and that are distributed and applied to the managed system by the system administrator and the managed system. This is because the information is utilized for creating an alternate policy regarding a similar system.

The policy modifying strategy storage unit 12*b* stores therein policy modifying strategies for creating an alternate policy. For example, the policy modifying strategy storage unit 12*b* is configured to store therein, as policy modifying strategies, methods such as: a threshold value relaxing method in which any one of or a plurality of the threshold values adapted in the procedure, the constraint, and the objective set up in the policy created by the system administrator are relaxed to create an alternate policy; a constraint deleting method in which any one of or a plurality of the set-up items in the constraint is deleted to create an alternate policy; and a procedure limiting method in which the set-up item in the procedure is limited to create an alternate policy.

The control unit 13 has an internal memory in which a program that prescribes a predetermined control program and various processing procedures and necessary data are stored, and performs various processes using the program and the necessary data. The control unit 13 includes a data receiving unit 13*a*, the policy integrity validating unit 13*b*, an alternate policy creating unit 13*c*, an alternate policy presenting unit 13*d*, and a validation result notifying unit 13*e*.

Among the units, the data receiving unit 13*a* receives from the administrator terminal device 20, via a network 1, the policy created by the system administrator and the system model obtained by modeling the managed system.

Here, the system model is created in such a manner that, for example, characteristics of a managed system that is constituted of a main system and a spare system is measured (see FIG. 3) by using a benchmark, and the system administrator models the managed system by defining the managed system by using the information obtained by the measurement (see FIG. 4).

A procedure to control operation performed by the managed system, a constraint to be observed by the managed system in operation, an objective to be achieved by the managed system are set up in the policy created by the system administrator (see FIG. 5).

Then, the data receiving unit 13*a* delivers the policy created by the system administrator and the system model to the policy integrity validating unit 13*b*.

The policy integrity validating unit 13*b* performs operations such as validating integrity between the policy created by the system administrator and the system model obtained by modeling the managed system. The policy integrity validating unit 13*b* validates integrity between the policy and the system model with a general model inspecting method (see, for example, E. M. Clarke, O. Grumberg, and D. A. Peled, Model Checking, The MIT Press, 1999.).

More specifically, the policy integrity validating unit 13*b* receives, from the data receiving unit 13*a*, the policy created by the system administrator and the system model, and then, validates if the system model can reach the objective set up in the policy without violating the constraint set up in the policy when the system model is operated according to the procedure set up in the policy. The policy integrity validating unit 13*b* determines that there is integrity between the policy and the system model when the system model can reach the objective set up in the policy without violating the constraint set up in the policy by following the procedure set up in the policy in any state that the system model can reach from the initial state. If it is determined that there is integrity between the policy created by the system administrator and the system model, the policy integrity validating unit 13*b* delivers the validation result to the validation result notifying unit 13*e* that is described later in detail.

On the other hand, the policy integrity validating unit 13*b* determines that there is no integrity between the policy created by the system administrator and the system model in a situation such as when the system model violates the constraint set up in the policy or can not reach the objective set up therein when the system model is operated according to the procedure set up in the policy, and when the system model results in a livelock in which operation performed by the system is never terminated and ends up in an infinite loop when the system model is operated according to the procedure set up in the policy. Here, the policy integrity validating unit 13*b* delivers an alternate policy creating instruction to the alternate policy creating unit 13*c*.

If the policy integrity validating unit 13*b* receives an alternate policy from the alternate policy creating unit 13*c* that is described later in detail, the policy integrity validating unit 13*b* validates integrity between the alternate policy and the system model. As a result of validation, if the policy integrity validating unit 13*b* determines that there is integrity between the alternate policy and the system model, the policy integrity validating unit 13*b* delivers the alternate policy to the alternate policy presenting unit 13*d* that is described later in detail. On the other hand, if the policy integrity validating unit 13*b* determines that there is no integrity between the alternate policy and the system model, the policy integrity validating unit 13*b* again delivers the alternate policy creating instruction to the alternate policy creating unit 13*c*.

The alternate policy creating unit 13*c* creates an alternate policy that replaces the policy created by the system administrator upon receiving the alternate policy creating instruction from the policy integrity validating unit 13*b*.

More specifically, the alternate policy creating unit 13*c* refers to the application examples stored in the application example storage unit 12*a*, and if there is a policy that corresponds to the managed system modeled as the system model, the alternate policy creating unit 13*c* adapts the corresponding policy as an alternate policy 1 (see FIG. 6).

The alternate policy creating unit 13*c* modifies any one of or a plurality of the procedure, the constraint, and the objective set up in the policy created by the system administrator according to a policy modifying strategy stored in the policy modifying strategy storage unit 12*b* to create an alternate policy. For example, the alternate policy creating unit 13*c* creates: an alternate policy 2 (see FIG. 7) in which the threshold value adapted in a procedure rule 1 set up in the policy created by the system administrator (see FIG. 5) is 50% relaxed; an alternate policy 3 (see FIG. 8) in which the threshold value adapted in a procedure rule 2 is 50% relaxed; an alternate policy 4 (see FIG. 9) in which the threshold value adapted in the constraint is 50% relaxed and is rounded off; and an alternate policy 5 (see FIG. 10) in which the objective threshold value is 50% relaxed.

The alternate policy creating unit 13*c* delivers the alternate policy created thereby to the policy integrity validating unit 13*b*.

Processes from the validating process in which integrity between the alternate policy and the managed system is validated by the policy integrity validating unit 13*b* to the creating process in which the alternate policy is created by the alternate policy creating unit 13*c* are repeated until the policy integrity validating unit 13*b* determines that there is integrity between the alternate policy and the system model.

The alternate policy presenting unit 13*d* delivers the alternate policy received from the policy integrity validating unit 13*b* to the administrator terminal device 20, and thus, presents the alternate policy to the system administrator. The alternate policy presenting unit 13*d* may present the alternate policies to the system administrator in a ranked manner (see FIG. 11). For example, the alternate policies are ranked so that alternate policies with less modifications made to the procedure, the constraint, and the objective set up in the policies are ranked higher in recommended priority. Or if there are alternate policies in which the same number of modifications are made, the alternate policies may be ranked so that an alternate policy in which the constraint is modified is ranked higher in recommended priority than an alternate policy in which the objective is modified and an alternate policy in which the procedure is modified is ranked higher in recommended priority than an alternate policy in which the constraint is modified. Or the alternate policies may be ranked so that an alternate policy in which items set up in the procedure, the constraint, and the objective are deleted is ranked lower than an alternate policy in which items set up therein are not deleted or so that an alternate policy that is stored in the application example storage unit 12*a* as an application example is ranked highest. The system administrator can appropriately select a ranking method of the alternate policies.

The validation result notifying unit 13*e* receives the validation result from the policy integrity validating unit 13*b*, and sends, to the administrator terminal device 20, a notification that there is integrity between the policy created by the system administrator and the managed system. Thus, the validation result notifying unit 13*e* notifies the system administrator.

The policy creating apparatus 10 can be embodied by implementing the various functions described above in an information processing device such as a known personal computer and a known workstation.

Figure 12:
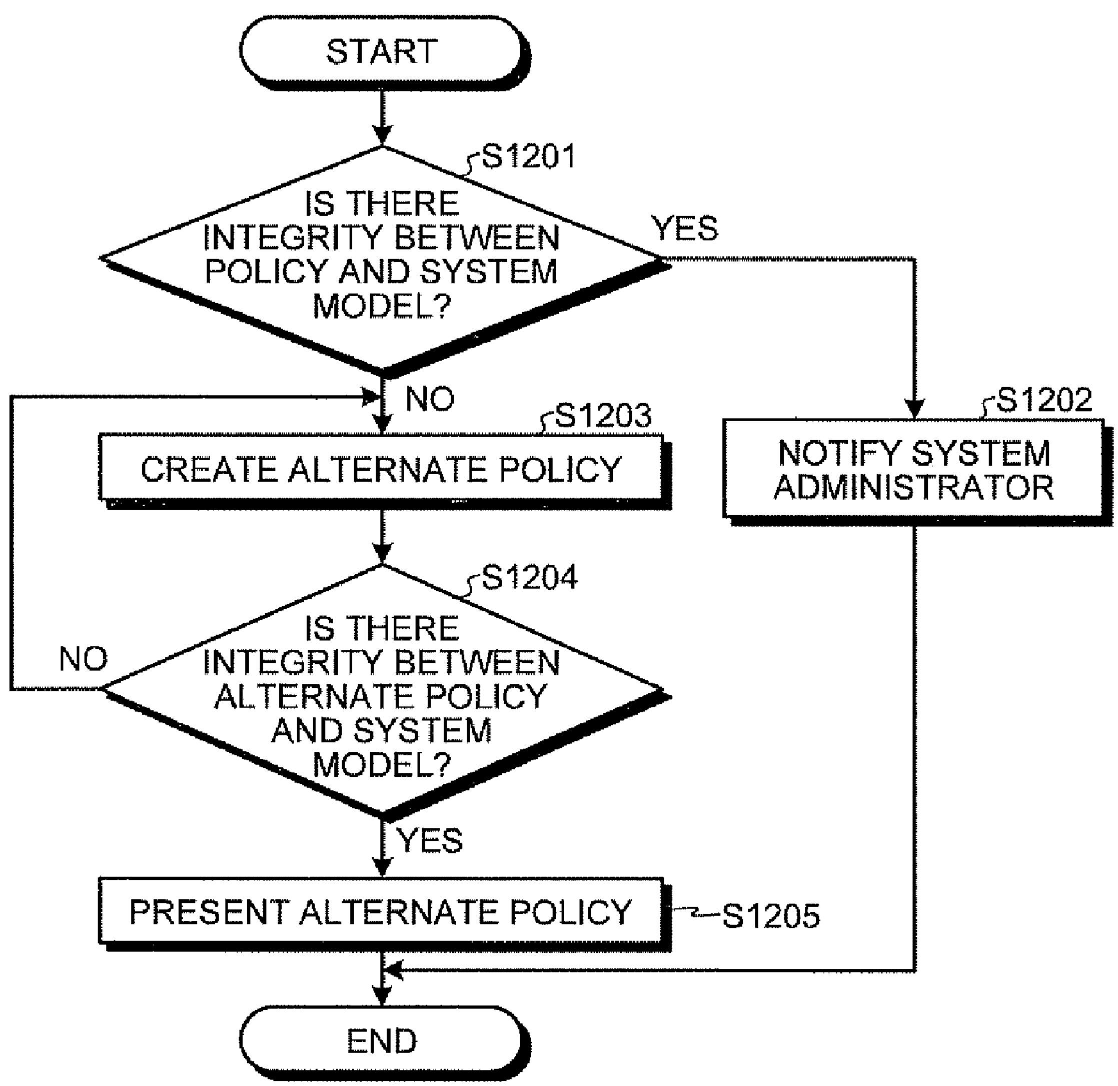
FIG. 12 is an example flowchart of the operation of the policy creating apparatus according to the first embodiment.

The operation of the policy creating apparatus according to the first embodiment is described in detail below with reference to FIG. 12. FIG. 12 is a flowchart of the operation of the policy creating apparatus according to the first embodiment.

As depicted in FIG. 12, the policy integrity validating unit 13*b* validates integrity between the policy created by the system administrator and the system model upon receiving, from the data receiving unit 13*a*, the policy created by the system administrator and the system model (Step S1201). More specifically, the policy integrity validating unit 13*b* validates if the system model can reach the objective set in the policy without violating the constraint set in the policy when the system model is operated according to the procedure set in the policy upon receiving, from the data receiving unit 13*a*, the policy created by the system administrator and the system model.

Then, the policy integrity validating unit 13*b* determines that there is integrity between the policy and the system model when the system model can reach the objective set up in the policy without violating the constraint set up in the policy by following the procedure set up in the policy in any state that the system model can reach from the initial state (No at Step S1201), and delivers the validation result to the validation result notifying unit 13*e*.

The validation result notifying unit 13*e* receives the validation result from the policy integrity validating unit 13*b*, and sends, to the administrator terminal device 20, a notification that there is integrity between the policy created by the system administrator and the system model. Thus, the validation result notifying unit 13*e* notifies the system administrator (Step S1202).

Returning to the description of Step S1201, the policy integrity validating unit 13*b* determines that there is no integrity (No at Step S1201) between the policy created by the system administrator and the system model in a situation such as when the system model violates the constraint set up in the policy or can not reach the objective set up therein when the system model is operated according to the procedure set up in the policy, and when the system model results in a livelock in which operation performed by the system is never terminated and ends up in an infinite loop when the system model is operated according to the procedure set up in the policy. Then, the policy integrity validating unit 13*b* delivers an alternate policy creating instruction to the alternate policy creating unit 13*c*.

Then, upon receiving the alternate policy creating instruction from the policy integrity validating unit 13*b* the alternate policy creating unit 13*c* creates an alternate policy that replaces the policy created by the system administrator (Step S1203).

More specifically, the alternate policy creating unit 13*c* refers to the application examples stored in the application example storage unit 12*a*, and if there is a policy that corresponds to the managed system modeled as the system model, the alternate policy creating unit 13*c* adapts the corresponding policy as an alternate policy 1 (see FIG. 6).

The alternate policy creating unit 13*c* modifies any one of or a plurality of the procedure, the constraint, and the objective set up in the policy created by the system administrator according to a policy modifying strategy stored in the policy modifying strategy storage unit 12*b* to create an alternate policy. For example, the alternate policy creating unit 13*c* creates: the alternate policy 2 (see FIG. 7) in which the threshold value adapted in the procedure rule 1 set up in the policy created by the system administrator (see FIG. 5) is 50% relaxed; the alternate policy 3 (see FIG. 8) in which the threshold value adapted in the procedure rule 2 is 50% relaxed; the alternate policy 4 (see FIG. 9) in which the threshold value adapted in the constraint is 50% relaxed and is rounded off; and the alternate policy 5 (see FIG. 10) in which the objective threshold value is 50% relaxed. The alternate policy creating unit 13*c* delivers the created alternate policy created to the policy integrity validating unit 13*b*.

Upon receiving the alternate policy from the alternate policy creating unit 13*c* the policy integrity validating unit 13*b* validates integrity between the alternate policy and the managed system (Step S1204). As a result of the validation, if the policy integrity validating unit 13*b* determines that there is integrity between the alternate policy and the system model (Yes at Step S1204), the alternate policy is delivered to the alternate policy presenting unit 13*d*. On the other hand, if the policy integrity validating unit 13*b* determines that there is no integrity between the alternate policy and the system model (No at Step S1204), the policy integrity validating unit 13*b* again delivers the alternate policy creating instruction to the alternate policy creating unit 13*c*.

Processes from the validating process in which integrity between the alternate policy and the system model is validated by the policy integrity validating unit 13*b* to the creating process in which the alternate policy is created by the alternate policy creating unit 13*c* are repeated until the policy integrity validating unit 13*b* determines that there is integrity between the alternate policy and the system model.

By delivering the alternate policy received from the policy integrity validating unit 13*b* to the administrator terminal device 20, the alternate policy presenting unit 13*d* presents the alternate policy to the system administrator (Step S1205). The alternate policy presenting unit 13*d* may present the alternate policies to the system administrator in a ranked manner (see FIG. 11).

As described above, according to the first embodiment, integrity between the administrator created policy and the system model is validated after receiving the administrator created policy created by a system administrator and the system model obtained by modeling characteristics of the managed system. If it is determined that there is no integrity between the administrator created policy and the system model, an alternate policy that replaces the administrator created policy is created. After revalidating integrity between the alternate policy and the system model, if it is determined that there is integrity between the alternate policy and the system model, the alternate policy is presented to the system administrator. Therefore, integrity between the system and the policy can be validated without using a test scenario. If no integrity is detected between the policy created by the administrator and the system, an alternate policy having integrity between the alternate policy and the system can be automatically created. Thus, a modified policy can be obtained without the need for substantial time and effort. The system administrator can create a new policy with minimal time and effort by using the alternate policy presented to the system administrator as a reference.

According to the first embodiment, application examples in which it is determined that there is integrity between the system and the policy are stored in the policy creating apparatus. If it is determined that there is no integrity between the administrator created policy and the system model, the application examples stored therein are referred to. If there is a policy that corresponds to the system model, the corresponding policy is adapted as an alternate policy. Thus, the most appropriate policy can be adapted with reference to the previous application examples.

According to the first embodiment, the policy includes at least the procedure to control operation performed by the managed system, the constraint to be observed by the managed system in operation, and the objective to be achieved by the managed system, and any one of or a plurality of the procedure, the constraint, and the objective that are created by the system administrator are modified to create an alternate policy. Therefore, an alternate policy in which a minute condition is modified can be created.

According to the first embodiment, any one of or a plurality of the threshold values adapted in the procedure, the constraint, and the objective that are set up as the policy are relaxed to create an alternate policy. Therefore, the alternate policy can be created with simple operation.

According to the first embodiment, any one of or a plurality of the set-up items in the constraint set as the policy is deleted to create an alternate policy. Therefore, the alternate policy with which the system does not reach a constraint violation state can be created.

According to the first embodiment, the set-up item in the procedure set up as the policy is limited to create an alternate policy. Therefore, the alternate policy with which the system does not reach a constraint violation state can be created without modifying the constraint.

According to the first embodiment, when a plurality of alternate policies is created, the alternate policies are ranked in ascending order of the number of modifications made to the procedure, the constraint, and the objective, and are presented. Therefore, the alternate policies corresponding to the system can be presented to the system administrator in a ranked manner.

According to the first embodiment, if it is determined that there is integrity between the administrator created policy and the system model, the system administrator is notified of the integrity. Therefore, the system administrator can recognize that there is integrity between the policy created by the system administrator and the system.

[b] Second Embodiment

In the first embodiment, an example is described in which processes from the validating process in which integrity between the alternate policy and the system model is validated by the policy integrity validating unit 13*b* to the creating process in which the alternate policy is created by the alternate policy creating unit 13*c* are repeated until the policy integrity validating unit 13*b* determines that there is integrity between the alternate policy and the system model. However, the present invention is not so limited. The policy creating apparatus 10 may be configured so that the system administrator is notified that an alternate policy cannot be created when the number of times the policy integrity validating unit 13*b* determines that there is no integrity between the alternate policy and the system model reaches a predetermined value. Accordingly, in a second embodiment of the present invention, a descriptions is given of a configuration of such a policy creating apparatus and the operation thereof.

A configuration of the policy creating apparatus according to the second embodiment is described in detail below. The configuration of the policy creating apparatus according to the second embodiment is similar to a configuration of the policy creating apparatus according to the first embodiment. The policy creating apparatus according to the second embodiment is, however, different from that in the first embodiment in the points described below.

The policy integrity validating unit 13*b* validates integrity between an alternate policy and the system model upon receiving the alternate policy from the alternate policy creating unit 13*c*. If the policy integrity validating unit 13*b* determines that there is no integrity therebetween, the policy integrity validating unit 13*b* determines if the number of times the policy integrity validating unit 13*b* determines that there is no integrity therebetween reaches a predetermined value. As a result of the determination, if the policy integrity validating unit 13*b* determines that the number of times the policy integrity validating unit 13*b* determines that there is no integrity therebetween reaches the predetermined value, the policy integrity validating unit 13*b* sends the determination result to the validation result notifying unit 13*e*. On the other hand, as a result of determination, if the number does not reach the predetermined value, the policy integrity validating unit 13*b* again sends an alternate policy creating instruction to the alternate policy creating unit 13*c*.

The validation result notifying unit 13*e* receives the determination result from the policy integrity validating unit 13*b*, and sends, to the administrator terminal device 20, a notification that an alternate policy cannot be created. Thus, the validation result notifying unit 13*e* notifies the system administrator.

Figure 13:
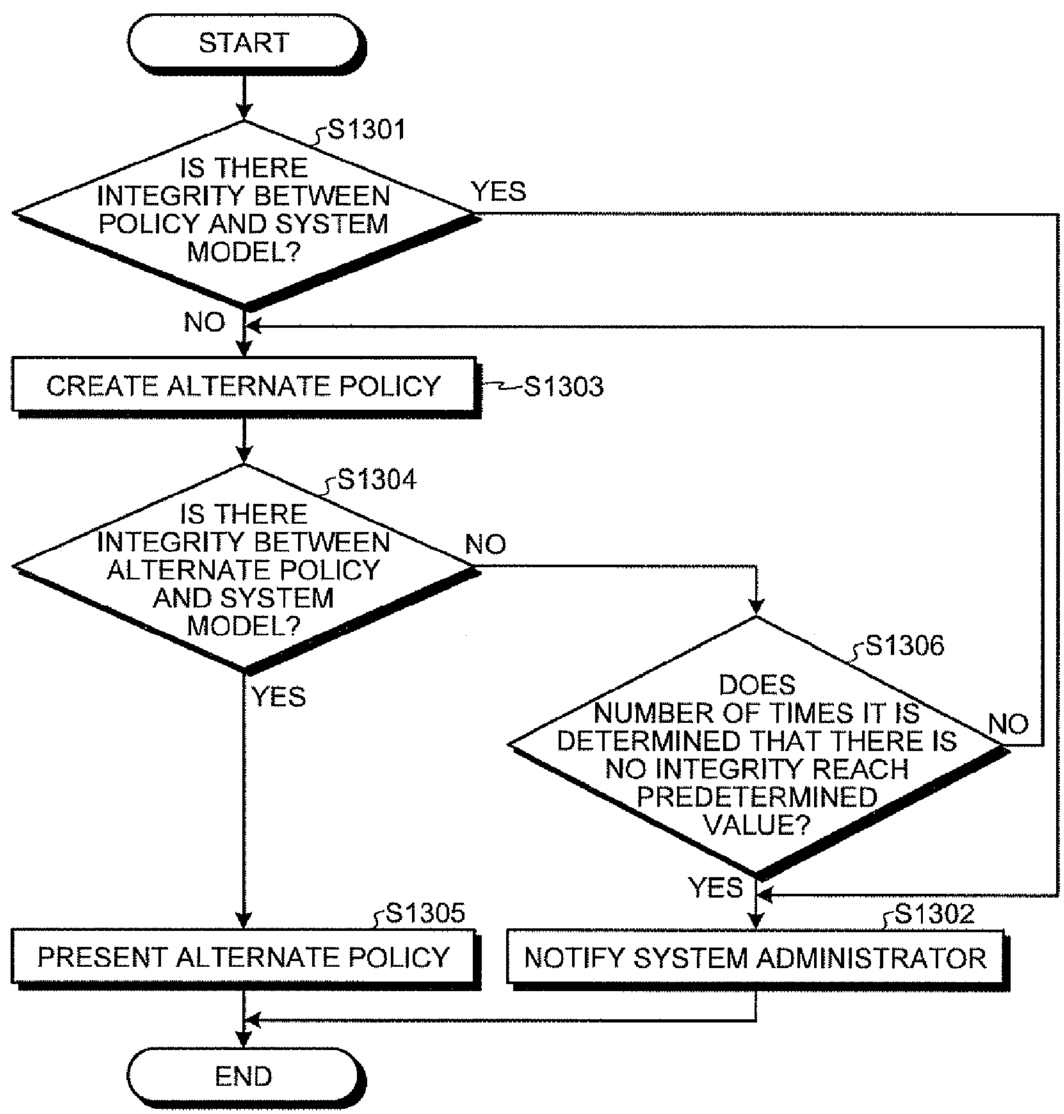
FIG. 13 is an example flowchart of processes performed by a policy creating apparatus according to a second embodiment of the present invention.

The operation of the policy creating apparatus according to the second embodiment is described in detail below with reference to FIG. 13. FIG. 13 is a flowchart of the operation of the policy creating apparatus according to the second embodiment. According to the second embodiment, the policy creating apparatus operates in a different manner in the points described below.

Upon receiving an alternate policy from the alternate policy creating unit 13*c*, the policy integrity validating unit 13*b* validates integrity between the alternate policy and the system model (Step S1304). If the policy integrity validating unit 13*b* determines that there is integrity between the alternate policy and the system model (Yes at Step S1304), as described in the first embodiment, the policy integrity validating unit 13*b* sends the alternate policy to the alternate policy presenting unit 13*d* that is described later in detail.

On the other hand, if the policy integrity validating unit 13*b* determines that there is no integrity between the alternate policy and the system model (No at Step S1304) the policy integrity validating unit 13*b* determines if the number of times the policy integrity validating unit 13*b* determines that there is no integrity therebetween reaches the predetermined value (Step S1306). As a result of the determination, if the number reaches the predetermined value (Yes at Step S1306), the policy integrity validating unit 13*b* sends the determination result to the validation result notifying unit 13*e*. On the other hand, as a result of determination, if the number of times the policy integrity validating unit 13*b* determines that there is no integrity therebetween does not reach the predetermined value (No at Step S1306), the policy integrity validating unit 13*b* again sends an alternate policy creating instruction to the alternate policy creating unit 13*c*.

The validation result notifying unit 13*e* receives the determination result from the policy integrity validating unit 13*b*, and sends to the administrator terminal device 20 a notification that an alternate policy cannot be created. Thus, the validation result notifying unit 13*e* notifies the system administrator (Step S1302).

As described above, according to the second embodiment, each time when it is determined that there is no integrity between the alternate policy and the system model, a new alternate policy that replaces the alternate policy is created. Each time the new alternate policy is created, integrity between the alternate policy and the system model is revalidated. When the number of times it is determined that there is no integrity between the alternate policy and the system model reaches the predetermined number, the system administrator is notified that an alternate policy cannot be created. Therefore, the system administrator can be provided with an opportunity to review if there is any deficiency in, for example, the first created policy.

While the first and second embodiments of the present invention are described above, other embodiments or modifications are also possible. In the following, such modifications are explained.

The constituent elements of the policy creating apparatus depicted in FIG. 2 are functionally conceptual, and need not be physically configured as illustrated. In other words, the specific mode of dispersion and integration of the constituent elements of the policy creating apparatus is not limited to the ones illustrated in the drawings. The constituent elements of the policy creating apparatus, as a whole or in part, may be divided or integrated either functionally or physically based on various types of loads or use conditions. For example, the alternate policy creating unit 13*c* and the alternate policy presenting unit 13*d* may be integrated. All or some of the processing functions performed by the policy creating apparatus may be implemented by a CPU or a program that is analyzed and executed by the CPU, or by a wired-logic hardware.

Figure 14:
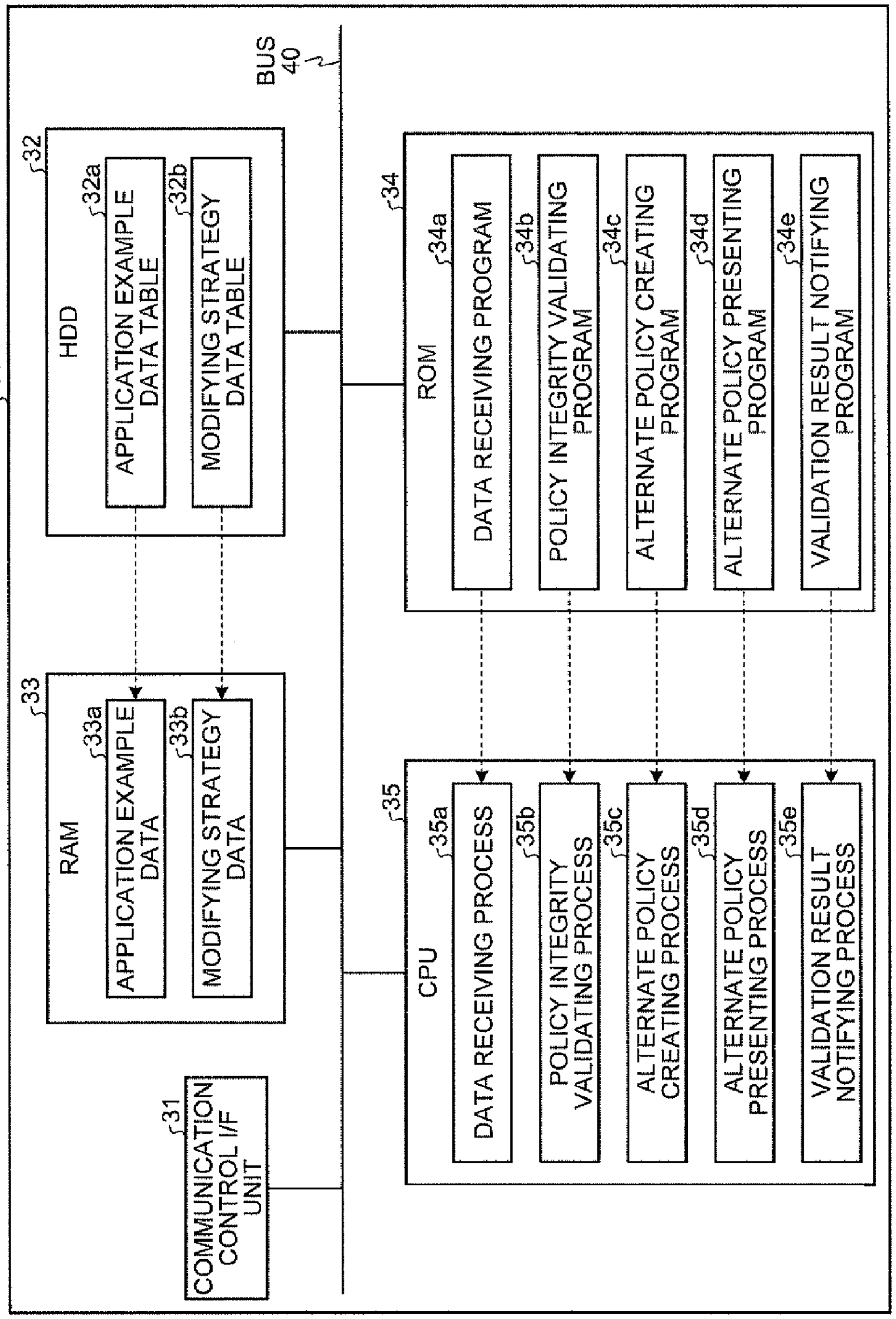
FIG. 14 is an example block diagram of a computer that executes a policy creating program.

Various processes described in the above embodiments (for example, see FIGS. 12 and 13) can be implemented by executing a program (hereinafter, "policy creating program") prepared in advance on a computer system such as a personal computer and a workstation. With reference to FIG. 14A, a detailed description is given below of an example of such a computer that executes a policy creating program realizing the same function as previously described in the above embodiments. FIG. 14 is a diagram of a computer that executes the policy creating program.

As depicted in FIG. 14, as the policy creating apparatus, a computer 30 includes a communication control I/F unit 31, an HDD 32, a RAM 33, a ROM 34, and a CPU 35, which are connected to each other via a bus 40. The communication control I/F unit 31 corresponds to the communication control I/F unit 11 depicted in FIG. 2.

The policy creating program realizing the same function as the policy creating apparatus described in the above embodiments is stored in the ROM 34 in advance. That is, as depicted in FIG. 14, a data receiving program 34*a*, a policy integrity validating program 34*b*, an alternate policy creating program 34*c*, an alternate policy presenting program 34*d*, and a validation result notifying program 34*e* are stored in the ROM 34 in advance. The programs 34*a*, 34*b*, 34*c*, 34*d*, and 34*e* may be appropriately divided or integrated, as with the constituent elements of the policy creating apparatus 10 depicted in FIG. 2. The ROM 34 may be a nonvolatile "RAM".

The CPU 35 reads the programs 34*a*, 34*b*, 34*c*, 34*d*, and 34*e* from the ROM 34 and executes the programs, and thus, as depicted in FIG. 14, the programs 34*a*, 34*b*, 34*c*, 34*d*, and 34*e* function as a data receiving process 35*a*, a policy integrity validating process 35*b*, an alternate policy creating process 35*c*, an alternate policy presenting process 35*d*, and a validation result notifying process 35*e*, respectively. The processes 35*a*, 35*b*, 35*c*, 35*d*, and 35*e* correspond respectively to the data receiving unit 13*a*, the policy integrity validating unit 13*b*, the alternate policy creating unit 13*c*, the alternate policy presenting unit 13*d*, and the validation result notifying unit 13*e* of the policy creating apparatus 10 depicted in FIG. 2.

As depicted in FIG. 14, the HDD 32 includes an application example data table 32*a* and a modifying strategy data table 32*b*. The application example data table 32*a* and the modifying strategy data table 32*b* correspond respectively to the application example storage unit 12*a* and the policy modifying strategy storage unit 12*b* depicted in FIG. 2. The CPU 35 reads application example data 33*a* and modifying strategy data 33*b* respectively from the application example data table 32*a* and the modifying strategy data table 32*b*, and stores the data 33*a* and 33*b* in the RAM 33. Then, the CPU 35 performs operation according to the application example data 33*a* and the modifying strategy data 33*b* stored in the RAM 33.

The programs 34*a*, 34*b*, 34*c*, 34*d*, and 34*e* are not necessarily stored in the ROM 34 in advance. For example, the programs 34*a*, 34*b*, 34*c*, 34*d*, and 34*e* may be stored in a "portable physical medium", such as flexible disk (FD), CD-ROM, DVD disk, magneto optical disk, and IC card, connectable to the computer 30 or in a "fixed physical medium" such as HDD provided inside or outside the computer 30. Further, the programs may be stored in "another computer" connected to the computer 30 via a public line, the Internet, LAN, WAN, and the like, so that the computer 30 can download the programs therefrom to execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A policy creating apparatus that creates a policy applied to a managed system to control autonomous operation of the managed system, the policy creating apparatus comprising:

a policy receiving unit that receives an administrator created policy created by a system administrator;

a model receiving unit that receives a system model obtained by modeling characteristics of the managed system;

a policy validating unit that validates integrity between the administrator created policy received by the policy receiving unit and the system model received by the model receiving unit;

an alternate policy creating unit that creates an alternate policy that replaces the administrator created policy when the policy validating unit determines that there is no integrity between the administrator created policy and the system model;

a policy revalidating unit that revalidates integrity between the alternate policy created by the alternate policy creating unit and the system model; and an alternate policy presenting unit that presents the alternate policy to the system administrator when the policy revalidating unit determines that there is integrity between the alternate policy and the system model;

wherein an application example storage unit stores therein an application example in which it is determined that there is integrity between a system and a policy, and the alternate policy creating unit refers to the application example stored in the application example storage unit when the policy validating unit determines that there is no integrity between the administrator created policy and the system model, and, if there is a corresponding policy that corresponds to the system model, adapts the corresponding policy as the alternate policy.

2. The policy creating apparatus according to claim 1, wherein the administrator created policy includes at least a procedure to control operation of the managed system, a constraint to be observed by the managed system in operation, and an objective to be achieved by the managed system, and the alternate policy creating unit modifies at least one of the procedure, the constraint, and the objective in the administrator created policy to create the alternate policy.

3. The policy creating apparatus according to claim 2, wherein the alternate policy creating unit relaxes at least one of threshold values adapted in the procedure, the constraint, and the objective to create the alternate policy.

4. The policy creating apparatus according to claim 2, wherein the alternate policy creating unit deletes at least one of set-up items in the constraint to create the alternate policy.

5. The policy creating apparatus according to claim 2, wherein the alternate policy creating unit limits a set-up item in the procedure to create the alternate policy.

6. The policy creating apparatus according to claim 2, wherein when the alternate policy creating unit creates a plurality of alternate policies, the alternate policy presenting unit ranks the alternate policies in ascending order of number of modifications in the procedure, the constraint, and the objective, and presents the alternate policies.

7. The policy creating apparatus according to claim 1, further comprising a notifying unit that notifies, when the policy validating unit determines that there is integrity between the administrator created policy and the system model, the system administrator of the integrity.

8. The policy creating apparatus according to claim 7, wherein each time the policy revalidating unit determines that there is no integrity between an alternate policy and the system model, the alternate policy creating unit creates a new alternate policy that replaces the alternate policy, each time the alternate policy creating unit creates a new alternate policy, the policy revalidating unit revalidates integrity between the new alternate policy and the system model, and when the policy revalidating unit has determined that there is no integrity between the new alternate policy and the system model predetermined times, the notifying unit notifies the system administrator that the alternate policy cannot be created.

9. A policy creating method for creating a policy applied to a managed system to control autonomous operation of the managed system using a processor, the policy creating method comprising:

receiving an administrator created policy created by a system administrator;

receiving a system model obtained by modeling characteristics of the managed system;

validating integrity between the administrator created policy and the system model;

creating an alternate policy that replaces the administrator created policy when it is determined that there is no integrity between the administrator created policy and the system model at the validating;

revalidating integrity between the alternate policy created at the creating and the system model; and presenting the alternate policy to the system administrator when it is determined that there is integrity between the alternate policy and the system model at the revalidating.

10. A computer readable storage medium containing instructions that, when executed by a computer, causes the computer to create a policy applied to a managed system to control autonomous operation of the managed system, the instructions causing the computer to perform:

receiving an administrator created policy created by a system administrator;

receiving a system model obtained by modeling characteristics of the managed system;

validating integrity between the administrator created policy and the system model;

creating an alternate policy that replaces the administrator created policy when it is determined that there is no integrity between the administrator created policy and the system model at the validating;

revalidating integrity between the alternate policy created at the creating and the system model; and presenting the alternate policy to the system administrator when it is determined that there is integrity between the alternate policy and the system model at the revalidating.

11. The computer readable storage medium according to claim 10, wherein the instructions further causing the computer to perform storing, in a storage unit, an application example in which it is determined that there is integrity between a system and a policy, and the creating includes referring to the application example stored in the storage unit when it is determined that there is no integrity between the administrator created policy and the system model at the validating, and, if there is a corresponding policy that corresponds to the system model, adapting the corresponding policy as the alternate policy.

12. The computer readable storage medium according to claim 10, wherein the administrator created policy includes at least a procedure to control operation of the managed system, a constraint to be observed by the managed system in operation, and an objective to be achieved by the managed system, and the creating includes modifying at least one of the procedure, the constraint, and the objective in the administrator created policy to create the alternate policy.

13. The computer readable storage medium according to claim 12, wherein the creating includes relaxing at least one of threshold values adapted in the procedure, the constraint, and the objective to create the alternate policy.

14. The computer readable storage medium according to claim 12, wherein the creating includes deleting at least one of set-up items in the constraint to create the alternate policy.

15. The computer readable storage medium according to claim 12, wherein the creating includes limiting a set-up item in the procedure to create the alternate policy.

16. The computer readable storage medium according to claim 12, wherein the presenting includes, when a plurality of alternate policies are created at the creating, ranking the alternate policies in ascending order of number of modifications in the procedure, the constraint, and the objective, and presenting the alternate policies.

17. The computer readable storage medium according to claim 10, wherein the instructions further causing the computer to perform notifying, when it is determined that there is integrity between the administrator created policy and the system model at the validating, the system administrator of the integrity.

18. The computer readable storage medium according to claim 17, wherein the creating includes creating, each time it is determined that there is no integrity between an alternate policy and the system model at the revalidating, a new alternate policy that replaces the alternate policy, the revalidating includes revalidating, each time a new alternate policy is created at the creating, integrity between the new alternate policy and the system model, and the notifying includes notifying, when it is determined that there is no integrity between the new alternate policy and the system model predetermined times at the revalidating, the system administrator that the alternate policy cannot be created.

* * * * *